(12) United States Patent
Kopf

(10) Patent No.: US 8,089,998 B2
(45) Date of Patent: Jan. 3, 2012

(54) ULTRA-SHORT PULSE LASER SYSTEM AND METHOD FOR PRODUCING FEMTOSECOND OR PICOSECOND PULSES

(75) Inventor: Daniel Kopf, Roethis (AT)

(73) Assignee: High Q Technologies GmbH, Rankweil (AT)

( * ) Notice: Subject to any disclaimer, the term of this patent is extended or adjusted under 35 U.S.C. 154(b) by 0 days.

(21) Appl. No.: 12/471,844

(22) Filed: May 26, 2009

(65) Prior Publication Data

US 2010/0303106 A1 Dec. 2, 2010

(51) Int. Cl.
*H01S 3/22* (2006.01)
*H01S 3/223* (2006.01)

(52) U.S. Cl. .......................... 372/60; 372/55

(58) Field of Classification Search .............. 372/18, 372/25, 60, 55
See application file for complete search history.

(56) References Cited

U.S. PATENT DOCUMENTS

| | | | |
|---|---|---|---|
| 4,194,170 A | 3/1980 | Kurnit | |
| 4,740,982 A | 4/1988 | Hakuta et al. | |
| 2003/0063884 A1* | 4/2003 | Smith et al. | 385/129 |
| 2005/0105867 A1* | 5/2005 | Koch et al. | 385/125 |
| 2005/0157382 A1 | 7/2005 | Kafka et al. | |
| 2006/0044562 A1* | 3/2006 | Hagene et al. | 356/437 |
| 2006/0056478 A1* | 3/2006 | Albrecht et al. | 372/55 |
| 2006/0193362 A1 | 8/2006 | Kopf et al. | |
| 2007/0253453 A1 | 11/2007 | Essaian et al. | |
| 2010/0215069 A1 | 8/2010 | Otsuka | |

FOREIGN PATENT DOCUMENTS

| | | |
|---|---|---|
| EP | 0 444 435 A2 | 9/1991 |
| WO | WO 2004/068656 A2 | 8/2004 |
| WO | WO 2009/028352 A | 3/2009 |

OTHER PUBLICATIONS

Calendron et al., "*High power cw and mode-locked oscillators based on Yb:KYW multi-crystal resonators*", Optics Express, Nov. 10, 2008, pp. 18838-18843, vol. 16, No. 23, Optical Society of America.
Palmer et al., "*Passively mode-locked Yb:KLu($WO_4$)$_2$ thin-disk oscillator opearated in the positive and negative dispersion regime*", Optics Letters, Jul. 15, 2008, pp. 1608-1610, vol. 33, No. 14, Optical Society of America.
Henesian et al., "*Stimulated rotational Raman scattering in nitrogen in long air paths*", Optics Letters, Nov. 1985, pp. 565-587, vol. 10, No. 11, Optical Society of America. Nibbering et al., "*Determination of the inertial contribution to the nonlinear refractive index of air, $N_2$ and $O_2$, by use of unfocused high-intensity femtosecond laser pulses*", J. Opt. Soc. Am. B, Mar. 1997, pp. 650-660, vol. 14, No. 3, Optical Society of America.
D. Herriott et al., "Off-Axis Paths in Spherical Mirrors Interferometers", Applied Physics, Bd. 3, Nr. 4, Apr. 1964, pp. 523-526.

* cited by examiner

*Primary Examiner* — Patrick Stafford
(74) *Attorney, Agent, or Firm* — Muncy, Geissler, Olds & Lowe, PLLC

(57) ABSTRACT

An ultra-short pulse laser system comprising an amplifying laser medium for producing a laser emission, a laser resonator having at least one resonator mirror and a pump source has a gas-filled section with a filling gas, the latter consisting of a single gas or a filling gas mixture differing from the composition of air, whose nonlinear refractive index $n_2$ substantially corresponds to that of air and which has a rotational Raman effect which is smaller in comparison with air.

16 Claims, 3 Drawing Sheets

ULTRA-SHORT PULSE LASER SYSTEM AND METHOD FOR PRODUCING FEMTOSECOND OR PICOSECOND PULSES

The invention relates to an ultra-short pulse laser system for producing femtosecond or picosecond pulses according to the precharacterizing clause of Claim 1 and a method for producing femtosecond or picosecond pulses in such an ultra-short pulse laser system according to the precharacterizing clause of Claim 15.

Ultra-short pulse laser systems, i.e. laser arrangements which are capable of producing laser pulses with a characteristic pulse duration in the femtosecond or picosecond range, have long been known in various embodiments from the prior art. Whereas in the past operation was effected under atmospheric conditions, an associated limitation of operating parameters has also increasingly become evident. Recent years and months have seen the publication of some scientific works on ultra-short pulse laser resonators in which the air was recognized as a substantial—and simultaneously limiting—variable. The nonlinear refractive index $n_2$ of the air is regarded as problematic here, so that attempts are being made to reduce this effect.

Thus, for example in Yb:KYW and Yb:KGW femtosecond lasers, it is possible in principle to produce very short pulses, for example having a duration of 100-150 fs or even shorter. However, this requires arrangements comprising comparatively short resonators and low output powers or output energies, e.g. 0.5 W at 70 MHz repetition rate. As soon as both the laser resonator length and the pulse energy are increased, the routinely achievable—shortest—pulse length becomes substantially longer and only pulse durations of 300 fs or even 500 fs are achievable. An example of such a laser arrangement in which the shortest achievable pulse duration is just 500 fs at particularly high powers is described in Calendron A. et al., "High power cw and mode-locked oscillators based on Yb:KYW multi-crystal resonators", Optics Express, Vol. 16, No. 23, 10 Nov. 2008, pages 18839-18843.

For eliminating the influences of air, US 2007/0223540 and Palmer et al., "Passively mode-locked Yb:KLu(WO$_4$)$_2$ thin-disk oscillator operated in the positive and negative dispersion regime", Optics Letters, Vol. 33, No. 14, 15 Jul. 2008, pages 1608-1610, propose replacing the air with a gas differing from the atmosphere or operating the laser at least with parts of the resonator in an evacuable pressure vessel. Here, the gas or gas mixture to be used must have a nonlinear refractive index which is lower than that of air. The use of helium is regarded as particularly suitable because its nonlinear refractive index is substantially (>>10 times) less than in air.

These proposed solutions of the prior art are directed towards substantially reducing the nonlinear refractive index of the gas medium compared with the value of air or producing a vacuum. A disadvantage with the use of helium is the complicated technical handling since helium is difficult to seal off. Moreover, in the case of femtosecond lasers, there is the disadvantage that the operating point thereof is substantially shifted with respect to the pulse length owing to the direct dependence of said operating point on the self-phase modulation within the resonator and hence owing to its considerable dependence on the nonlinear refractive index of the gas medium in the case of a helium-flooded laser.

Another alternative is to redesign the laser arrangement so that a particularly high degree of coupling out can be used and hence the power or intensity required for providing the coupled-out power within the resonator can be reduced. As a result, the interaction between the laser pulse and the gas medium is reduced or is no longer troublesome, so that operation under atmospheric conditions is possible. In order to realize, for example, a 78% coupling-out, the laser must have an arrangement with a multiplicity of passes through the laser medium so that the arrangement possesses considerable complexity. Moreover, such an arrangement has the disadvantage that aberrations in the laser medium are additive over all passes and the production of the installed laser medium requires complicated compliance with production tolerances.

A third alternative which minimizes the troublesome nonlinear interaction between laser pulse and the air consists, in the case of femtosecond lasers having relatively short laser pulses, for example shorter than 500 fs, in operating this laser not in the so-called soliton mode-locking operating range but in the operating range of positive cycle dispersion or in the chirped pulse mode. There, the pulse circulating within the resonator can be maintained for substantially longer, i.e. for example a few picoseconds, but can be compressed externally to the desired femtosecond pulse length. The more complex arrangement due to the subsequently required external compression of the pulse and the problem that picosecond lasers are more difficult to stabilize with a respect to instabilities are disadvantageous here. Moreover, the actually achieved powers and pulse lengths have to date not yet been substantially better than those which can be achieved with soliton mode-locking in comparable lasers.

The last two proposed solutions are therefore based on more complex or more expensive technical arrangements and are in principle also limited in the achievable powers. The use of evacuated resonator zones or filling gases having a nonlinear refractive index $n_2$ differing from air has the problem that, in the event of a pressure change or mixing with air, a shift in the operating point of the laser follows. Precisely with regard to robust long-term operation, correspondingly durable seals can be realized only with difficulty. In addition, it is precisely the helium favored in the prior art that is difficult to seal off in the long term, owing to its atomic weight.

An object of the present invention is to provide an improved ultra-short pulse laser system and a method for producing femtosecond or picosecond pulses.

A further object is to provide such a laser system which has increased robustness and long-term stability of the operating parameters.

In particular, it is a further object to permit robust operation of an ytterbium femtosecond laser having a pulse length of less than 300 fs, a pulse repetition rate of less than 50 MHz and a pulse energy above 1 µJ in single-pulse operation.

A further object is to increase the range in which such a laser system can still be operated with soliton mode-locking without the occurrence of double or multiple pulse states.

These objects are achieved by the subjects of claim 1 and 15, respectively, or of the dependent claims or the solutions are further developed.

The invention relates to ultra-short pulse laser systems and a corresponding method for producing femtosecond or picosecond pulses in such a laser system, i.e. in laser arrangements which are designed in terms of their laser media and components used, the arrangement thereof and the characteristic operating parameters for producing pulses having durations in the range of a few hundred picoseconds to a few multiples of ten femtoseconds.

The solution according to the invention is based on the approach of providing, within the laser resonator in an ultra-short pulse laser system, a gas-filled section through which the beam path is led. This section may comprise either the total resonator or only one part-section or individual part-sections. Thus, in particular components used for folding the beam path, which of course define a major part of the zone, can be in the form of gas-filled sections. According to the invention, this section is filled with an individual gas or a filling gas mixture differing from the composition of air, as filling gas, the nonlinear refractive index $n_2$ of the gas-filled section corresponding substantially to that of air, and the filling gas having a rotational Raman effect which is smaller in comparison with air. Because the nonlinear refractive index $n_2$ of the filling gas or of the gas-filled section is substantially the same in comparison with atmospheric conditions, a shift in the operating point due to slight entry of air can be prevented or can be reduced to such an extent that it is acceptable. According to the invention, the refractive index can, however, also be adjusted to the value of air by adapting the pressure of the non-atmospheric filling gas, so that in this case a pressure change or penetration of air would lead to changes in the operating point. In contrast to solutions of the prior art, it is however possible, according to the invention, also to use gases and gas mixtures which have a high atomic or molecular weight and for which stable long-term seals can be readily realized technically.

The solution according to the invention is based on the finding that the existing limitations of the operation of ultra-short pulse lasers can be avoided or at least reduced by reducing the rotational Raman effect. A more substantial reduction is effected by the use of gases which also have no vibrational Raman bands. The approach according to the invention is particularly suitable for femtosecond lasers having a pulse energy of at least one microjoule within the laser resonator and/or repetition rate below 50 MHz.

With the use of monoatomic gases or molecules which have no vibrational and rotational states, the gas medium in the laser no longer imposes any limitation for achieving high peak powers and peak intensities in the ultra-short pulse laser resonator. This is the case, for example, with the noble gases, i.e. with the use of argon, krypton, xenon, which enjoy the advantage of substantially easier handling compared with helium and moreover have a nonlinear refractive index which, in contrast to helium, does not differ substantially from that of air. Compared with helium there is therefore the advantage that, in the event of a pressure change or of partial mixing with the external air, which can be avoided only with difficulty over long operating times of a sealed housing over months and years, even in the case of a good technical design, no substantial change in the operating point is to be expected owing to an unchanged nonlinear refractive index or a non-linear refractive index which has changed only insignificantly compared with the use of helium.

An increase in the signal radiation in a laser arrangement owing to the Raman effect can be described as the product of (a) the material-dependent Raman gain coefficient, (b) the intensity of the pump radiation, (c) the intensity of the signal radiation and (d) the interaction length.

In fibers, the Raman effect is known and permits, for example, Raman laser and the soliton self-frequency shift there. The Raman effect is so pronounced in lasers because a small beam radius and a long interaction length are simultaneously achievable. In the case of fibers, there is, however, in principle no rotational states of the fixed ions, which is in contrast to most molecular gases, such as, for example, nitrogen, which have rotational states which can be excited at substantially lower energies.

For nitrogen as the gas which is dominant in air, for example, Henesian M. A. et al., "Stimulated rotational Raman scattering in nitrogen in long air paths", Optics Letters, Vol. 10, No. 11, November 1985, pages 565-567, describe the following values: gR=2.5 $10^{-14}$ m/W at 1053 nm pump wavelength and shifts of 59, 75, and 91 $cm^{-1}$. In a rough estimation, the ("rotational") Raman gain coefficient for nitrogen is nominally 4 to 5 times lower than the Raman gain coefficient in a glass fiber, but the frequency offset is more than 5 times smaller, so that in the end the increase in the Raman gain coefficient as a function of the frequency offset for nitrogen is even greater than that for the glass fiber. This means that the Raman effect at small frequency offset with otherwise identical parameters in air or nitrogen is greater than in a glass fiber.

Suitable gasses without rotational Raman bands are monoatomic gases, for example noble gases or molecules, whose main moments of inertia are the same or approximately the same, i.e. are in the form of spherical gyroscopes. Owing to the symmetry of these molecules, they have no permanent dipole moment and hence show no rotational spectrum. Examples of these are methane or sulfur hexafluoride.

Gases or gas mixtures having a nonlinear refractive index the same or substantially corresponding to air but a rotational Raman effect reduced compared with air are therefore used. This is advantageous in particular as soon as the pulse energy within the laser resonator exceeds one microjoule and/or the laser repetition rate is below 50 MHz.

As a result of the alternative, possible according to the invention, to the use of helium or neon, it is also possible to use gases and gas mixtures whose gas particles are atoms or molecules which have an atomic weight of more than 20 atomic mass units. The tightness of O-rings or other seals, as are required for achieving the gas tightness of a housing or of a housing section, is approximately proportional to the atomic or molecular weight of the gas particles present therein. It results in the advantage that the technical realization of a gas-tight housing is substantially easier and more advantageous with comparatively heavy gases since tightness can be ensured for a longer time. The following atomic or molecular weights of gas particles may serve as a comparison:

Helium He: 4;
Methane $CH_4$: 16;
Neon Ne: 20;
Nitrogen $N_2$: 28;
Oxygen $O_2$: 32;
Argon Ar: 40;
Krypton Kr: 84;
Xenon Xe: 131;
Sulfur hexafluoride $SF_6$: 146;
Carbon tetrachloride $CCl_4$: 152.

In addition, gases which can be used should be chemically inert, which is the case, however, for the noble gases and halides mentioned.

Specific values for the nonlinear refractive index n are shown, for example, in Table 3 on page 658 in Nibbering E. T. J. et al., "Determination of the inertial contribution to the nonlinear refractive index of air, $N_2$ and $O_2$ by use of unfocused high-intensity femtosecond laser pulses", JOSA B, Vol. 14, No. 3, March 1997, pages 650-660, these applying to a wavelength of 800 nm and a pulse length of 120 fs.

Ar $1.4 \cdot 10^{-23}$ $m^2/W$ Rotational Raman contribution=0
Xe $8.1 \cdot 10^{-23}$ $m^2/W$ Rotational Raman contribution=0
$SF_6$ $1.6 \cdot 10^{-23}$ $m^2/W$ Rotational Raman contribution=0
$N_2$ $2.3 \cdot 10^{-23}$ $m^2/W$ Rotational Raman contribution=$2.3 \cdot 10^{-28}$ $m^2/J$
$O_2$ $5.1 \cdot 10^{-23}$ $m^2/W$ Rotational Raman contribution=$8.5 \cdot 10^{-28}$ $m^2/J$
Air $2.9 \cdot 10^{-23}$ $m^2/W$ Rotational Raman contribution=$3.6 \cdot 10^{-28}$ $m^2/J$ Values for a wavelength of 1020-1070 nm are likely to be somewhat lower. From the above list, for example, the following gases can be used according to the invention as filling gases for ultra-short pulse laser systems, individually or in a gas mixture, it being possible for the reduction of the Raman interaction between the gas and the laser pulse to reach different degrees:

(1) $SF_6$ (no rotational Raman bands)
(2) Ar/Xe mixture (no rotational Raman bands)
(3) Ar/Xe mixture having an Xe fraction and a pressure of such that $n_2$ is the same as that for air (no rotational Raman bands)
(4) Kr (no rotational Raman bands), optionally with suitable pressure adaptation so that the nonlinear refractive index $n_2$ of the mixture corresponds to that of air
(5) Ar/$O_2$ (reduced rotational Raman effect compared with air), it being possible for the $O_2$ fraction to be such that the nonlinear refractive index $n_2$ of the mixture corresponds to that of air
(6) Ar/$N_2$ (reduced rotational Raman effect compared with air)
(7) Ar, Kr or Xe mixed with $O_2$ so that a mixture results which can be inhaled and at the same time has a nonlinear refractive index $n_2$ which corresponds to that of air This usability, according to the invention, of such filling gases and the effects thereof are confirmed by experimental measurements in a Yb:KYW femtosecond laser having an intracavity peak intensity of ~5 . . . 10 $GW/cm^2$ and a resonator length of 15 m. Here, it can be observed that the desired short pulses cannot exceed a certain peak intensity with simultaneously desired pulse energy owing to the interaction between the laser pulse and the gas medium air. The observations to be made in this context are not in agreement with the requirement known from the prior art for reduction of the nonlinear refractive index by the use of helium.

On increase in the pumping power in the laser, the pulse length in solution mode-locking is as expected shorter but the central wavelength shifts from initially ~1040 nm gradually up to 1045 nm. If the range of stable single pulse operation is exceeded, i.e. with further increased pumping power, the laser operates in the double- or multiple-pulse mode and has substantially more power and moreover a central wavelength which is once again close to 1040 nm, i.e. the wavelength jumps back. These observations apply in the case of air as the gas medium in the laser.

If on the other hand argon is used, different behavior follows. Here, an instability or the double-pulse mode is no longer observable and the laser emits substantially higher power and shorter pulses in the desired single-pulse mode. No spectral shift is measurable. The same observations can also be made with the use of xenon.

The ultra-short pulse laser system according to the invention and the method according to the invention for producing ultra-short laser pulses are described in more detail or illustrated below, purely by way of example, with reference to working examples shown schematically in the drawing. Specifically, FIG. 1 shows the schematic diagram of a first working example of the ultra-short pulse laser system according to the invention;

Figure 1:
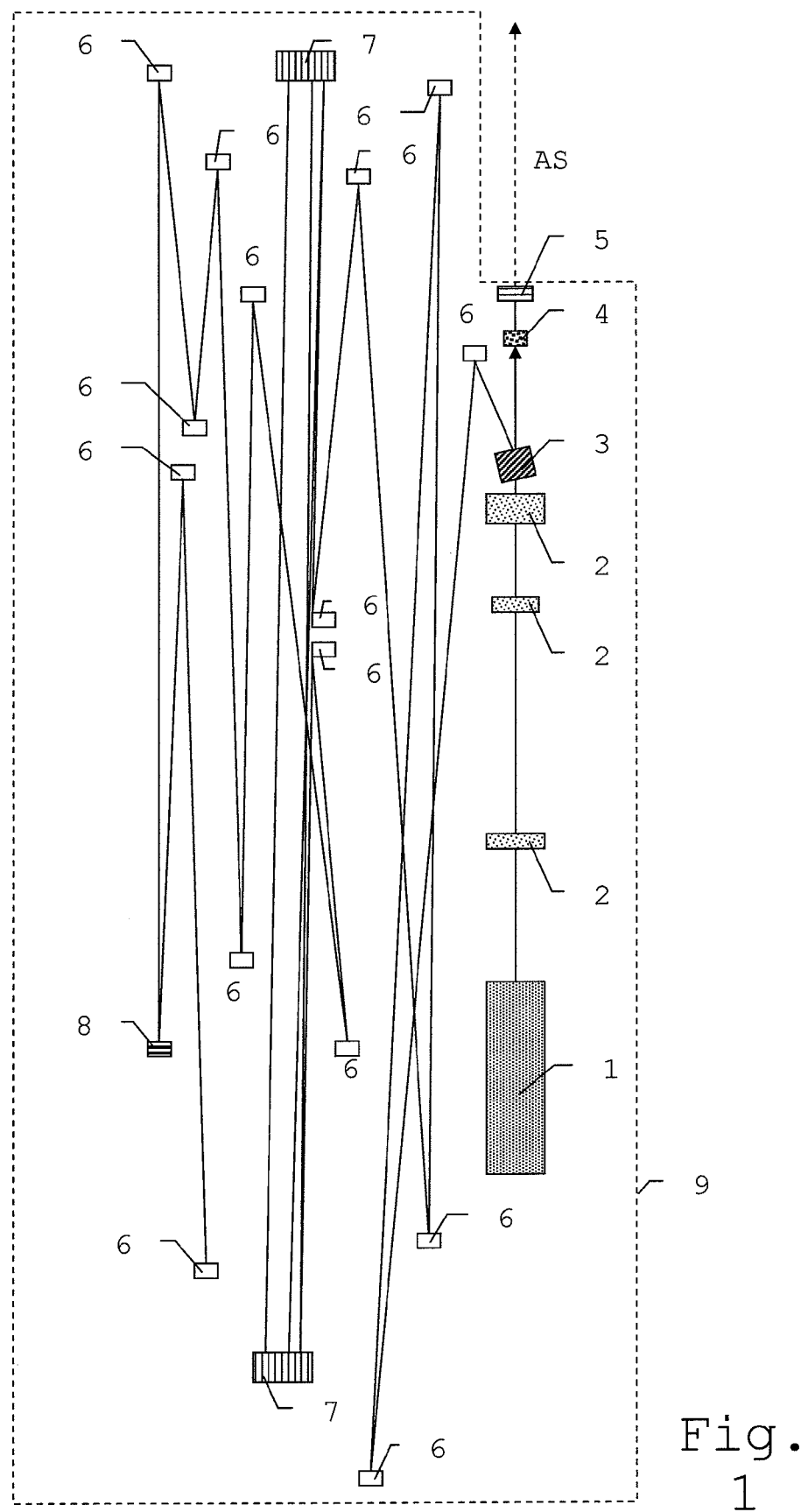

FIG. 1 shows the schematic diagram of a laser arrangement for a first working example of the ultra-short pulse laser system according to the invention for producing femtosecond or picosecond pulses. Here, the laser arrangement has at least one pump source 1, in particular a laser diode source, for pumping an amplifying laser medium 4 for producing the laser emission, the pump beam path being led via a sequence of lenses 2 as a coupling-in optical system and a dichroic pump mirror 3. The coupling-out of the usable laser emission AS is effected via an optical output coupler 5 downstream of the laser medium 4. In this example, Yb:KYW is used as laser medium 4, which is placed within the laser resonator with a plurality of curved or planar resonator mirrors 6. Among the resonator mirrors, individual ones are provided with a coating which has a negative group velocity dispersion (GVD). The laser resonator also has two Herriot mirrors 7 and a saturable absorber mirror 8 as a component for producing mode-locking.

In this ultra-short pulse laser system, either the total arrangement or only a section within the resonator is filled with a filling gas comprising an individual gas or a filling gas mixture differing from the composition of air, the nonlinear refractive index $n_2$ of the gas-filled section 9 substantially corresponding to that of air, and the filling gas having a lower rotational Raman effect in comparison with air, which is realized, for example, by atomic gases or, in the case of molecular gases, when a part, in particular more than half, of the molecules of the filling gas have the property of a spherical gyroscope. The beam path of the laser emission to be produced is led through this gas-filled section 9 within the laser resonator. A peak intensity within the laser resonator of more than 2 $GW/cm^2$, in particular of more than 5 $GW/cm^2$, in the stable single-pulse mode can thus be produced.

The filling gas may be present either in a tight vessel comprising the entire arrangement or in smaller containers only for individual components or section-by-section. Thus, for example, a gas-filled section can be designed as a gas-tight Herriot cell. For a vessel encapsulating the total arrangement, it is possible, as shown in this example, for the optical interface of the vessel to be realized by the output coupler 5 as an optical window. In addition to a purely gas-tight design, the gas-filled section 9 can also be designed as a pressure vessel with adjustable, in particular controllable, pressure. It is advantageous here to introduce the filling gas approximately at atmospheric pressure into the laser. Placing the laser resonator or parts thereof under a vacuum has the technical disadvantage that the housing is then under considerable external pressure and deformation and bending are unavoidable; for example, a load of up to 10 tons results in the case of an area of 1 $m^2$. Those components of the laser resonators which are sensitive to tilting react to such deformation as a rule with power loss, which moreover is dependent on the external air pressure. Depending on the application, this requires complicated power regulation by adjustment of the resonator, which as a rule is undesired. It is therefore advantageous to minimize the difference between internal pressure and external pressure. The use of a pressure equilibration vessel makes it possible to keep the pressure difference between interior and exterior approximately constant in the case of air pressure variations, so that corresponding loads can be avoided or at least reduced. In order to keep the composition of the filling gas unchanged or to permit replacement in the case of gas losses, a gas pressure cell or gas cartridge and a preferably controlled valve are used. The arrangements serves as a reservoir or storage component for the filling gas or its constituents, in order to compensate the unavoidable leakage rate of a housing and to ensure a constant internal pressure.

The filling gas may consist of a single atomic or molecular gas or may consist of a mixture of different gases, it also being possible to use a proportion of air depending on the purpose and the further gases used. The filling gas may comprise, for example, at least 20 percent by volume, in particular at least 50 percent by volume, of a gas which has no rotational Raman bands or additionally no vibrational Raman bands. The filling gas may consist in particular of argon, xenon, krypton, methane, carbon tetrachloride and/or sulfur hexafluoride as the only gas or may have this as part of a gas mixture.

In order to reduce the volatility of the gas filling or the passage through the seals, filling gas may be composed exclusively of gases having an atomic or molecular weight equal to or greater than twenty times the atomic mass unit.

The first working example described is in the form of a femtosecond laser with Yb:KYW or Yb:KGW as laser medium 4, with a 30 W laser diode at 980 nm as pump source 1, a 7.5 m long resonator, i.e. a pump repetition rate of 20 MHz, a coupling-out of 6.5% and a pulse length of from 250 to 300 fs at a central wavelength of 1040-1045 nm. The saturable absorber mirror 8 serves for starting and stabilizing the mode-locking. Instead of air, for example, a noble gas is used here as an atomic gas having a nonlinear refractive index not too different from that of air, i.e. for example argon, krypton or xenon. The laser is operated in the soliton mode-locking range and contains four GTI laser folding mirrors 6 having a negative group velocity dispersion of 500 $fs^2$. No external pulse compression is required, for example in contrast to the chirped pulse mode.

The power achievable in this laser setup in the stable single-pulse mode is substantially higher with the filling gas in contrast to air and easily reaches above 3 W since the Raman effect does not constitute any limitation due to frequency shifting. The prior art discloses further specific arrangements which describe a Yb:KYW or Yb:KGW laser having such parameters.

A further development is obtained if the pressure can be regulated by a control unit so that a specified pulse length can be produced. This provides a laser arrangement having an adjustable pulse length and/or spectral width, in which such an adjustment can be effected without having to change the pump power, i.e. at optimal power. The desired or set gas pressure results in a pulse length of the femtosecond or picosecond pulse train which is intended in laser operation, which can be determined by measurement or calculation for regulation.

The ultra-short pulse laser system according to the invention can be realized with a multiplicity of materials with the identical aim of achieving short laser pulses having a peak power of a few gw/cm$^2$ in the resonator, as laser medium 4. Thus, for example, Yb:KYW, Yb:KGW, Yb:YAG, Yb:KLuW, Nd:YAG or Nd:vanadate are suitable, it being possible, for example, to produce pulse lengths of about 700 fs or up to a few picoseconds with Yb:YAG or picosecond pulses by means of Yb:KLuW, Nd:YAG or Nd:vanadate.

Figure 2:
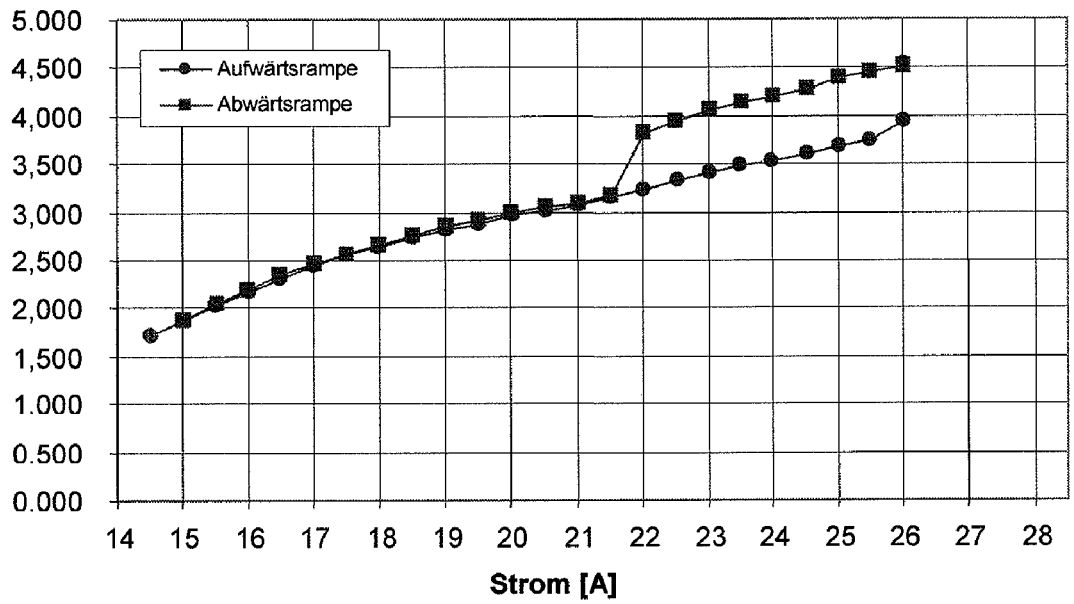
FIG. 2 shows the measured average power in the resonator for an air-filled embodiment according to FIG. 1.

The measured average power in the resonator for an air-filled embodiment according to FIG. 1 is shown in FIG. 2. In this case, this laser arrangement is not operated according to the invention with a special filling gas but is operated under atmospheric conditions, i.e. with an air filling. The curve of the power against the pump current is shown, both the ascending and the descending ramp being shown. Under these circumstances, the shortest stable pulse can be achieved at 274 fs and an average power of 3.1 W on increasing the pump current. Higher currents result in an undesired bistability, i.e. the laser operates either in the single-pulse mode or in the double-pulse mode without it being possible to effect an external adjustment or a choice here. In the double-pulse mode, the pulse energy is divided between two pulses, and each pulse has a longer pulse length.

Figure 3:
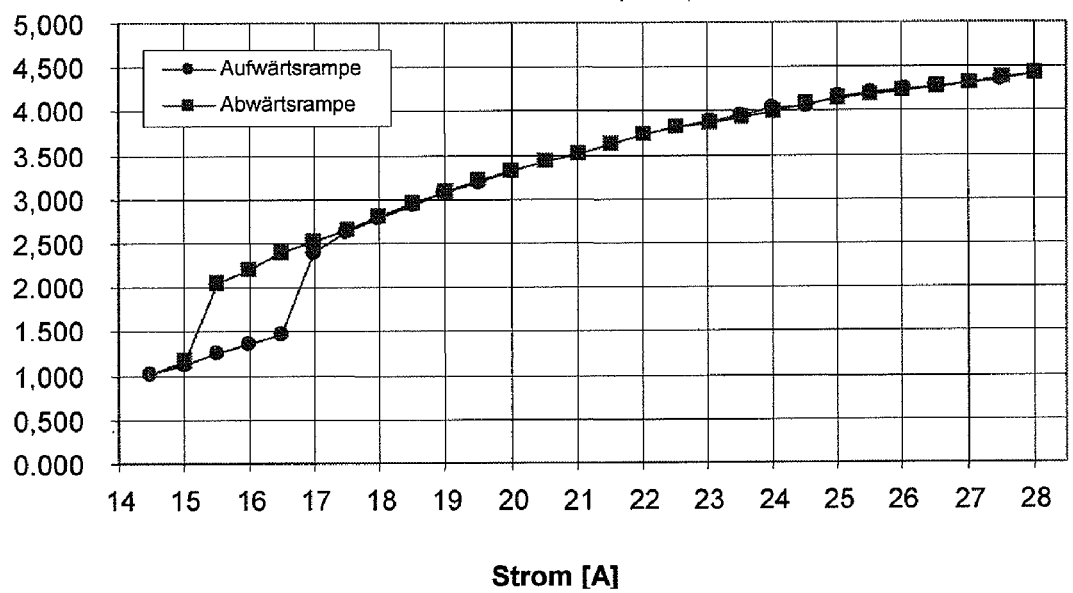
FIG. 3 shows the measured average power in the resonator for the first working example of the ultra-short pulse laser system according to the invention and FIG. 4 shows the schematic diagram of a second working example of the ultra-short pulse laser system according to the invention.

FIG. 3 shows, in the same manner, the measured average power in the resonator for the first working example of the ultra-short pulse laser system according to the invention, i.e. with a filling gas according to the invention. With the use of a neutral gas mixture, for example an argon/krypton or argon/air mixture, the bistability is absent and the laser emits stable 220 fs pulses at 4.38 W power. The peak power in the resonator is 16.6 Mw, and the peak intensity on constriction of the laser mode in the resonator is 19.6 GW/cm$^2$ at a mode area of $165^2$ μm$^2$.

Figure 4:
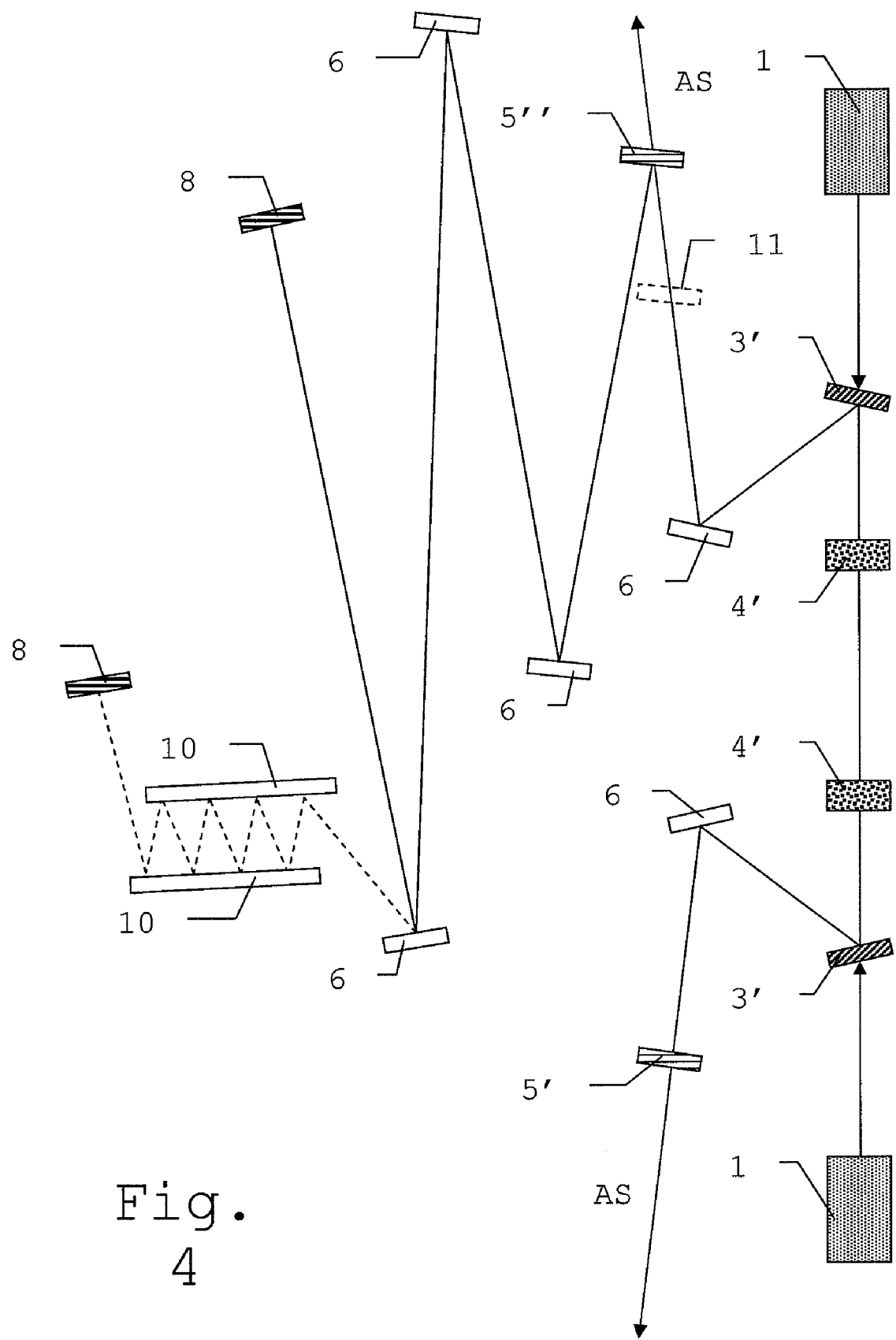

The schematic diagram of a second working example of the ultra-short pulse laser system according to the invention appears in FIG. 4. The arrangement of the laser components corresponds to the laser system already mentioned at the outset and described in Calendron A. et al., "High power cw and mode-locked oscillators based on Yb:KYW multi-crystal resonators", Optics Express, Vol. 16, No. 23, 10 Nov. 2008, pages 18839-18843, said laser system now being operated not in air but in argon or another suitable gas having a nonlinear refractive index $n_2$ similar to air, and therefore generating substantially shorter pulses.

The laser arrangement now uses two fiber-coupled 30 W laser diodes with 981 nm wavelength and a core diameter of 200 μm as pump sources 1, which are coupled into two laser media 4' via a lens system, which is not shown and two dichroic pump mirrors 3'. Yb:KYW crystals are used as material for the laser media 4'. The laser resonator is formed by a sequence of curved and planar resonator mirrors 6 and a saturable absorber mirror 8. Two Gires-Tournois interferometer mirrors 10 with −500 fs$^2$ negative dispersion can optionally be used for dispersion correction.

By introducing a mirror 11 into the laser resonator, a short symmetrical resonator is produced, from which the laser emission AS can then be coupled out using an output coupler 5' having a reflectivity of 90%.

For the operation of the long laser resonator in soliton mode-locking, i.e. without the mirror 11, the output coupler 5' has a reflectivity of 85%. In the case of the dispersion correction by the Gires-Tournois interferometer mirror 10, the reflectivity of the optical output coupler 5' is increased to 99% while a second output coupler 5" having 95% reflectivity and +250 fs$^2$ dispersion is added.

For example, a femtosecond laser having an intracavity pulse energy of more than one microjoule can be operated as further working examples according to the invention, instead of coupling out several percent with the aid of acousto-optical or electro-optical pulse output couplers, i.e. so-called cavity dumping. This is coupled out with a frequency which is at least twice the resonator circulation frequency. In the case of cavity dumping, it is usually desired to achieve as high a pulse energy as possible within the laser resonator. In general, therefore, no coupling-out is used in order to achieve a maximum increase in the power within the laser resonator and hence the pulse energy, and the coupling-out is in the end effected only by the cavity dumping route. Owing to the Raman effect in molecular gasses, the maximization of the intracavity pulse energy—provided that short (e.g. femtosecond) pulses are desired and hence the peak intensity can exceed several GW/cm$^2$ in the resonator—is subject to a limitation or an increase in the pulse energy within the laser resonator is possible only on acceptance of pulses which simultaneously become longer, which is undesired for some applications. This limitation is absent when a filling gas according to the invention is used instead of air. Particularly femtosecond lasers based on the principle of the coupling-out of pulses benefit in particular from the situation that the resonator can be operated according to the invention in such a filling gas.

The invention claimed is:

1. An ultra-short pulse laser system for producing femtosecond or picosecond pulses, comprising at least
    an amplifying laser medium for producing a laser emission,
    a laser resonator having at least one resonator mirror and at least one gas-filled section and
    a pump source, in particular a laser diode source, for pumping the laser medium, in particular having a pulse energy of at least 1 microjoule within the laser resonator and/or a repetition rate below 50 MHz,
wherein the gas-filled section is filled with a filling gas comprising a single gas or a filling gas mixture differing from the composition of air,
    the nonlinear refractive index $n_2$ of the gas-filled section substantially corresponding to that of air and
    the filling gas having a rotational Raman effect which is smaller in comparison with air.

2. The ultra-short pulse laser system as claimed in claim 1, wherein the filling gas comprises at least 20 percent by volume, of a gas which has no rotational Raman bands.

3. The ultra-short pulse laser system as claimed in claim 2, wherein the filling gas has no vibrational Raman bands.

4. The ultra-short pulse laser system as claimed in claim 1, wherein the filling gas is composed exclusively of gases having an atomic or molecular weight equal to or greater than twenty times the atomic mass unit.

5. The ultra-short pulse laser system as claimed in claim 1, wherein the filling gas comprises argon, xenon, krypton, methane, carbon tetrachloride or sulfur hexafluoride.

6. The ultra-short pulse laser system as claimed in claim 1, wherein more than half of the molecules of the filling gas have the property of a spherical gyroscope.

7. The ultra-short pulse laser system as claimed in claim 1, wherein the gas-filled section is in the form of a pressure vessel with adjustable, in particular controllable, pressure.

8. The ultra-short pulse laser system as claimed in claim 7, wherein the pressure can be regulated by a control unit so that a predetermined pulse length can be produced.

9. The ultra-short pulse laser system as claimed in claim 7, comprising a storage component for the filling gas or its constituents.

10. The ultra-short pulse laser system as claimed in claim 1, wherein the gas-filled section is in the form of a Herriot cell.

11. The ultra-short pulse laser system as claimed in claim 1, comprising a component for producing mode-locking, in particular a saturable absorber mirror.

12. The ultra-short pulse laser system as claimed in claim 1, wherein the laser medium comprises Yb:KYW, Yb:KGW, Yb:YAG, Yb:KLuW, Nd:YAG or Nd:vanadate.

13. The ultra-short pulse laser system as claimed in claim 1, wherein a peak intensity within the laser resonator of more than 2, in particular more than 5, $GW/cm^2$ can be produced.

14. The ultra-short pulse laser system as claimed in claim 1, comprising an electro-optical or acousto-optical pulse output coupler component in the laser resonator.

15. A method for producing femtosecond or picosecond pulses in an ultra-short pulse laser system, comprising at least
    an amplifying laser medium for producing a laser emission (AS),
    a laser resonator having at least one resonator mirror and
    a pump source, in particular a laser diode source, for pumping the laser medium, and
guidance of the beam path of the laser emission to be produced through a gas-filled section within the laser resonator, in particular having a pulse energy of 1 microjoule within the laser resonator and/or a repetition rate below 50 MHz,
wherein the gas-filled section is filled with a filling gas comprising a single gas or a filling gas mixture differing from the composition of air,
    the nonlinear refractive index $n_2$ of the gas-filled section substantially corresponding to that of air and
the filling gas having a rotational Raman effect which is smaller in comparison with air.

16. The ultra-short pulse laser system as claimed in claim 1, wherein the filling gas comprises at least 50 percent by volume of a gas which has no rotational Raman bands.

* * * * *